United States Patent [19]
Conti

[11] Patent Number: 4,582,297
[45] Date of Patent: * Apr. 15, 1986

[54] TAPE AND METHOD FOR MEASURING AND/OR PULLING CABLE

[75] Inventor: Allen C. Conti, Garfield Heights, Ohio

[73] Assignee: Arnco Corporation, Westlake, Ohio

[*] Notice: The portion of the term of this patent subsequent to Apr. 2, 2002 has been disclaimed.

[21] Appl. No.: 691,557

[22] Filed: Jan. 15, 1985

Related U.S. Application Data

[63] Continuation of Ser. No. 405,317, Aug. 5, 1982, Pat. No. 4,508,317, which is a continuation-in-part of Ser. No. 346,385, Feb. 5, 1982, abandoned.

[51] Int. Cl.⁴ .............................................. H02G 1/08
[52] U.S. Cl. .................... 254/134.3 FT; 254/134.3 R; 254/134.4; 174/117 M
[58] Field of Search .............. 254/134.3 FT, 134.3 R, 254/134.4; 73/862.42; 174/117 M; 139/383 R, 425 R; 297/472

[56] References Cited

U.S. PATENT DOCUMENTS

| | | | |
|---|---|---|---|
| 3,028,146 | 4/1962 | Sparks | 254/134.3 FT |
| 3,322,163 | 5/1967 | Hughes | 139/383 R |
| 4,372,535 | 2/1983 | Gibson et al. | 254/134.3 R |
| 4,508,317 | 4/1985 | Conti | 254/134.3 FT |

OTHER PUBLICATIONS

*Textile World,* Jan. 1975, "How to Weave High-Tensile Webbings" pp. 109–111.

*Primary Examiner*—Frederick R. Schmidt
*Assistant Examiner*—Steven P. Schad
*Attorney, Agent, or Firm*—Clifford A. Poff; Thomas H. Murray

[57] ABSTRACT

A cable is pulled in a duct or along an overhead support line according to a method and through the use of a tape comprised of warp and weft threads. Indicia printed on the web is used to indicate the length of the course of travel for the cable along which the web extends. The width of the web is sufficient to affix indicia on the surface thereof. The web has an elongation of 10% or less at a break strength which is in excess of 750 pounds of pull force. The pull strength of the woven web is about 2900–3000 pounds. The web is comprised of strands of parallel filaments of yarn consisting of aromatic polyamide fibers. Insulated conductors are incorporated in the tape as two of many warp threads according to a second tape embodiment for conducting a tension signal along the tape. After a length of the course of travel is measured with the tape, one end of the tape is connected to the leading end of a cable while the remaining end of the tape is connected to a winch.

12 Claims, 6 Drawing Figures

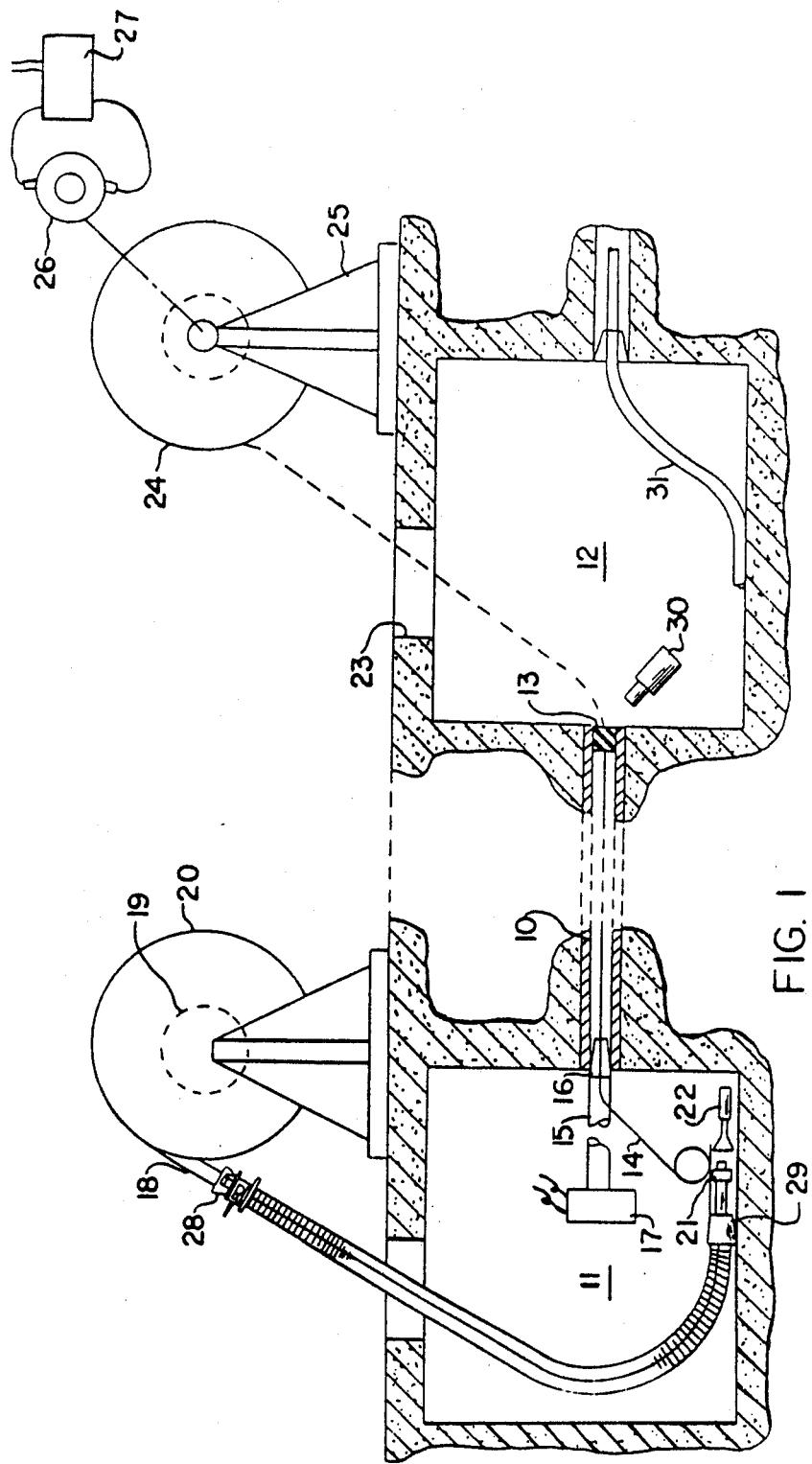

TAPE AND METHOD FOR MEASURING AND/OR PULLING CABLE

CROSS-REFERENCE TO RELATED APPLICATION

This application is a continuation of application Ser. No. 405,317, filed Aug. 5, 1982, now U.S. Pat. No. 4,508,317, which is a contination-in-part of application Ser. No. 346,385, filed Feb. 5, 1982 now abandoned.

BACKGROUND OF THE INVENTION

This invention relates to a method and apparatus to pull cable and/or to measure the length of a cable-retaining structure, such as an underground conduit or overhead support line, incident to the installation of a cable. More particularly, the present invention relates to using a tape or web comprised of warp and weft threads, preferably with indicia thereon to indicate the length of the cable-retaining structure along which the web extends. If desired, the tape includes conductors for transmitting a tension signl.

In the placement of underground cables, particularly telephone communication cables and electric utility cables, it is desired, and usually necessary, to measure the length of a particular duct in which the cable is placed or overhead line which is to be used for supporting the cable. Sometimes, for example, a cable is provided with connectors prior to its placement in the duct or onto an overhead line. A measurement of the duct length or length of overhead line is first necessary to procure the correct length of preconnecterized cable. It is also necessary to measure the length of a duct or support line when placing a cable comprised of optical fibers for procuring and installing the cable. Careful and cautious handling of a cable made up of optical fibers is necessary. The optical fibers of the cable are particularly susceptible to fatigue fractures that will occur some time after a tension stress excursion beyond the yield point of the optical fiber material. Loss of integrity of the fibers may not immediately occur even though the tension on one or more of the fibers in a bundle exceeds the yield point of the material. Because of this phenomenon, tensioning of a cable comprised of optical fibers must be controlled with greater care during pulling in a conduit or otherwise installing procedures than is usually necessary when installing a cable comprised of metal conductors. As a necessary incident to controlling tension on the cable, it is important that the cable or line which is used to pull the cable possess sufficient strength and a minimum of elongation so that temporary increases and decreases of resistance during the cable placing operation will not result in even momentary stess excursions on the cable.

In the past, the length of a cable duct was measured using a tape comprised of, for example, a weftless web of parallel fibers adhered together by an adhesive. This tape does not possess sufficient strength to permit its use for pulling a cable. Therefore, after measuring the duct length, the tape was used to introduce a pull line in the duct for the actual cable pulling operation. One tape which has been manufactured in the past is made of strands of polyamide resin which possess the strength and chemical resistance necessary to pull a cable in a duct, but unfortunately, the weftless tape is manufactured by adhering parallel threads of polyamide resin with glue or resin. When this occurs, the tape lacks sufficient strength to even permit its use for pulling a winch line into the duct. The tape has almost no further value for accomplishing further procedures to install a cable. However, sometimes the tape can be used to install a nylon rope which is then used to install a wire line which is, in turn, used to install a winch line in a duct to accomplish the cable placement operation. In addition to the foregoing, I have discovered that the use of resins or glues used in the manufacture of such tapes is detrimental to the duct system because the resin or glue adheres to the surface of the duct, thus impeding and sometimes preventing subsequent cable pulling operations.

A minimal elongation of a tape or line under a pull force is important for achieving accurate measurements of a duct. For example, a nylon rope can stretch to over 40% of its free length before breaking. Moreover, when the pull line is used for the cable placement operations, the strength of the pull line must be adequately large so that if exceeded, the pull line will not shear with a dangerous backlash force.

SUMMARY OF THE INVENTION

It is an object of the present invention to provide a tape and a method for measuring and/or pulling cable in a duct through the use of such tape which includes a web comprised of warp and weft threads and preferably indicia on the web to indicate the length of a duct along which the web extends.

It is a different object of the present invention to provide a tape and a method for using the tape in the pulling of cable in a duct or installing cable on an overhead support line in which the tape embodies a construction for minimizing elongation to about 10%, preferably 4%, or less at a break strength which is in excess of 750 pounds of pull force.

More particularly, in one aspect of the present invention there is provided a tape for use in pulling cable along a course of travel, the tape comprising warp and weft threads, the tape having an elongation of 10% or less at a break strength which is in excess of 750 pounds of pull force. Preferably, the tape further includes indicia to indicate the length of the duct or course along which the tape extends, the tape having a normal width sufficient to affix the indicia thereon. Means such as metal wires, each covered with a sheathing of insulation, are preferably arranged to form wrap threads along opposite sides of the tape to conduct a tension signal in the direction of the length of the tape.

The present invention in a further aspect thereof provides a method for pulling a cable along a desired course wherein the method comprises the steps of selecting a tape comprised of warp and weft threads, the tape having indicia at spaced-apart distances to indicate units of length for measuring the length of the desired course, feeding the tape from one end of the course to the opposite end of the course, using the indicia on the tape to measure the length of the course, and using the measurement for selecting a desired length of cable to be placed along the course.

In a still further aspect of the present invention there is provided a method for installing a cable along a desired course by the steps of selecting a tape comprised of warp and weft threads, feeding the tape along the course, coupling the tape to an end of the cable, and pulling the cable by the tape along the course.

In its preferred form, the tape of the present invention has a pull strength of about 2900–3000 pounds, and a weight of about 7 pounds per 1000 feet at a nominal width of 1 inch and a thickness of 1/32nd of an inch. The woven form of warp and weft threads provides strands of parallel filaments of yarn which preferably consist of aromatic polyamide fibers.

These features and advantages of the present invention as well as others will be more fully understood when the following description is read in light of the accompanying drawings, in which:

FIG. 1 is an elevational view, in section, illustrating the general organization of parts for pulling cable in an underground conduit using the method and tape of the present invention;

FIG. 2 is a plan view of one terminal end portion of a tape according to the present invention;

FIG. 3 is a sectional view taken along line III—III of FIG. 2;

FIG. 4 is an enlarged fragmentary view of the tape shown in FIG. 2 illustrating the warp and weft threads of the tape;

Figure 5:
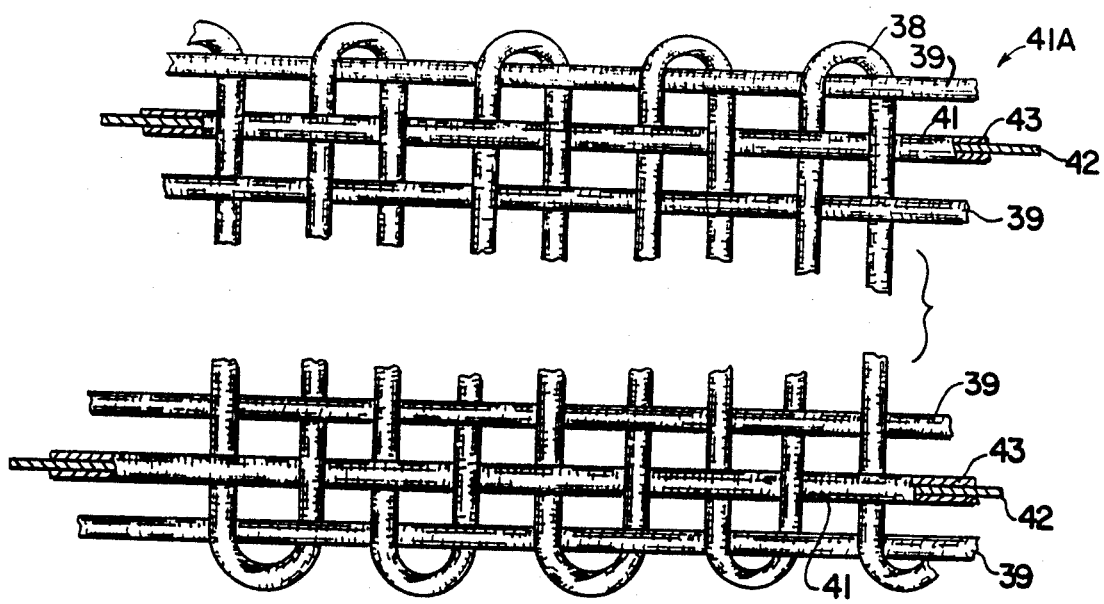
FIG. 5 is an enlarged fragmentary view of a further embodiment of the tape including metal conductors for a tension signal.

In FIG. 1 of the drawings, there is illustrated an underground conduit or duct 10 extending between underground work areas 11 and 12. Usually, an array of ducts extends below ground level between work areas 11 and 12. The length of the duct which is to be measured by the use of the tape according to the present invention may be in excess of 1500 feet. A plug 13, sometimes referred to in the art as a pig, is secured to the leading end of a tape 14, the details of which will be described hereinafter. The plug with the tape secured thereto is installed into an exposed opening of the duct 10 located in the work area 11. The tape extends through a suitable opening in the side wall of a conduit 15 having an adapter nozzle 16 at one end to fit tightly in the duct. Means 17 supplies a fluid medium to the free end of the conduit 15. Such means may comprise an air blower; however a supply of pressurized water can be used. The plug is propelled along the length of the conduit by energizing means 17. At the discharge end of the conduit, the plug is removed from the conduit by workmen and the leading end of the tape is positioned into a desired relation with the conduit so that a measurement can be taken of a length of the conduit. The purpose of this measurement is to determine the necessary length of cable which is to be installed in the conduit. Usually, the actual length of the conduit is to be determined so that the leading end of the tape is placed in registry with the end of the conduit in work area 12. The personnel in work area 11 applies tension to the tape under a small force sufficient to straighten the tape in the duct while the leading end of the tape is anchored or held in place by other personnel in work area 12.

As will be described in greater detail, indicia preferably in the form of incremental markings along the length of the tape provides the means by which the workmen can determine the length of the tape which extends along the actual duct. After the measurement is completed, the measurement information is used for ordering the desired length of cable. The lead time between measuring and placing the cable can be 2 to 3 months during which time the tape, if it is to be used to pull or install a cable in the conduit, is allowed to remain in the underground conduit. Since the tape is comprised of an interlocking weave, the tape can safety remain in the duct. I have discovered that the woven tape construction is far superior to weftless tape using an adhesive to hold the strands thereof together. Such an adhesive will break down in the continued presence of subsurface water which includes acids or other caustic chemicals.

A desired length of cable 18 comprised of telephone communication cable or an electric utility cable is coiled about an arbor 19 of a supply reel 20. The tape and method of the present invention are particularly useful for telephone communication cables comprised of a multiplicity of optical fibers within a sheating of plastic material. A connector 21, per se, well known in the art, forms part of a cable eye that is attached to the leading end of the cable. A tension meter 22 is preferably connected closely adjacent the leading end of the cable to form an interconnecting element between the cable and a pull line which, in the preferred form of the present invention, is comprised of the tape 14. However, when extremely high tensions are necessary to install the cable in the duct, e.g., in excess of 3000 pounds, it is necessary to thread aircraft cable through the duct. This is accomplished by affixing the leading end of the aircraft cable to a free end of the tape 14 and then threading the aircraft cable to the duct by withdrawing the tape. The free end of tape 14 or the free end of such aircraft cable is attached to the tension meter 22. The tape or cable is threaded through a manhole opening 23 for work area 12 where it is wrapped about the arbor of a tension reel 24. The tension reel is supported on a suitable frame 25. A drive motor 26 is connected to rotate the reel 24. A control 27 for motor 26 is used to control the tension which is applied to the tape 14.

To protect and guide the cable during passage from reel 20 into the work area 11, it is preferred to thread the leading end of the cable through a lubricating collar 28, such as disclosed in U.S. Pat. Nos. 4,028,473 or 4,326,605 for discharging a suitable lubricant onto the surface of the cable. The cable passes from the lubricating collar 28 along a length of a feeder tube which may be used according to the method described in U.S. Pat. No. 4,202,530 and that the tube may take the form of the feeder tube disclosed in my U.S. Pat. No. 4,296,157. An adapter 29 is used to interconnect the discharge end of the feeder tube with the entry end of the duct 10.

After the leading end of the cable is fed through the collar 28 and the guide tube, the connector 21 is secured thereto. A connector with the in-line tension meter 22 is placed into the entry end of the conduit. The adapter 29 can then be engaged with the entry end of the conduit so that the guide tube protects the outer surface of the cable as it is drawn from the reel 20. This occurs by energizing the drive motor 26. The control 27 is used to prevent the development of excessive tension on the cable during placement in the conduit. Such control is preferably carried out through the use of a signal provided by the load meter in a manner disclosed in my copending application Ser. No. 346,386, filed Feb. 5, 1982. To carry out the preferred form of this method, a detector 30 is arranged at the discharge end of the conduit to receive a signal that is transmitted by the load meter for indicating the magnitude of the tension that is applied to the leading end of the cable by the tape. The output signal from the detector 30 may be used as the basis for adjusting the control 27 during the cable pulling operation. After the leading end of the cable emerges from the duct 10 in work area 12, it is disengaged from the connector 21 so that the pull tape can be wound completely on reel 24. Thereafter, the usual cable splicing operations can be carried out with the terminal end of a further cable 31 located within the work area 12.

In view of the foregoing, it is apparent to those skilled in the art that cable can be pulled along an overhead support line by employing the tape 14 to measure the length of the course before procuring and installing the cable. Moreover, the cable can be installed on the overhead support line by using the tape 14 to form the pull line to move the leading end of the cable along the course.

FIGS. 2-4 illustrate in greater detail the construction of the tape 14 for use in pulling a cable along a course from one end to the opposite end thereof. The course may comprise an underground duct or an overhead track along a support line. The tape has warp threads 39 and a weft thread 38. In the preferred form, the warp ad weft threads take the form of strands of parallel yarn filaments comprised of aromatic polyamide fibers which provide a tape pull strength of between 2900-3000 pounds with an elongation at a break strength of approximately 4%. An elongation of 10% under a pull force of 750 pounds is acceptable within the scope of the present invention. The tape is comprised of 20-100 warp ends, but preferably 50, of 1500 denier KEVLAR 29 (Trademark by E. I. DuPont). A tape made of this material with 50 ends has a very high strength to weight ratio without adhesives. At 50 ends, the weight of the tape is about 7 pounds per 1000 feet and at 20 ends, the weight of the tape is about 2.8 pounds per 1000 feet, whereby it can be efficiently transmitted over an extended length of a conduit in excess of 1500 feet by the use of a fluid medium, such as air, as described hereinbefore. KEVLAR 29 is one of a family of aromatic polyamide fibers under the generic name ARAMID with a tension strength of 400,000 pounds per square inch and a modulus of 9,000,000 pounds per square inch. KEVLAR yarn with a denier of 1500 has a yield of 2976 yards per pound at 1000 filaments with a zero twist. The nominal yarn diameter is 0.0212 inch. The yarn is presently available at 9000 and 15,000 denier, 4000 and 10,000 filaments, respectively, zero twist and 0.052 and 0.0671 diameter, respectively. The high strength to weight ratio of the tape comprised of warp and weft threads is important not only because of the low elongation at break strength, but also to insure accurate measurements of a length of the order of 1500 feet. To carry out such measurements, indicia is printed, woven or otherwise placed on the tape at preselected intervals along its length. The indicia may be in English or metric dimensions as desired and in FIG. 2, examples of such indicia are indicated by reference numerals 36 and 37. The chemical resistance of KEVLAR 29 while excellent is no detriment to printing of indicia thereon and it has been found that printing methods and materials well know in the art can be used. The chemical resistance of the KEVLAR 29 material is given in the following table:

TABLE

| CHEMICAL RESISTANCE TO YARN OF KEVLAR 29 ARAMID | |
| --- | --- |
| Environment (100 hr* exposure at 70° F.; 21° C.) | Tensile Strength Loss % |
| ACIDS | |
| Formic (90%) | 10 |

TABLE-continued

| CHEMICAL RESISTANCE TO YARN OF KEVLAR 29 ARAMID | |
| --- | --- |
| Environment (100 hr* exposure at 70° F.; 21° C.) | Tensile Strength Loss % |
| Hydrochloric (37%) | 90 |
| Hydrofluoric (10%) | 12 |
| Nitric (70%) | 82 |
| Sulfuric (70%) | 100 |
| OTHER CHEMICALS | |
| Brake Fluid (312 hr) | 2 |
| Greases ($MoS_2$ and Lithium base) | 0 |
| Jet Fluid (JP-4) (300 hr) | 0 |
| Ozone (1000 hr) | 0 |
| Tap Water | 0 |
| Boiling Water | 0 |
| Superheated Water 156° C. (313° F.) 80 hr | 16 |

*Except where noted.

Exposure of the aromatic polyamide fibers to intense ultraviolet light for over a period of time, for example, 5 weeks has a deteriorating effect to the material. However, the tape is usually protected by a duct or the outer sheating against attack by ultraviolet radiation. Adequate protection for the tape against exposure can be carried out prior to its placement.

As best shown in FIG. 4, weft thread 38 intersects warp threads 39 at right angles, typically in the form of a linen or plain weave. The weft thread 38 is continuous by the formation of reverse bends in which the weft thread at the edge passes over a warp thread; wraps around the outer end of the warp thread and returns underneath the warp thread. While only four warp threads 39 are shown in FIG. 4, it is to be understood, of course, in the preferred embodiment, 50 such warp threads form the tape of the present invention. The interlocking weave of the tape assures greater strength and overcomes the disadvantages of using glue or resin to bond the threads together as well as the attendant problem of deterioration of the bonding materials when residing in the conduit over a long period of time. Moreover, a tape having resin or glue, even though it may not deteriorate, is subject to transfer of the resin or glue to the internal wall surface of the duct or overhead cable carriers by rubbing contact therewith. This impedes subsequent pulling operations since the glue will increase friction with the surface of a cable in rubbing contact with the glue residue. I have also found that glue or resin is ineffective to prevent separation of high strength threads of tape under high tension, particularly at the points where the tape rubs against the wall surfaces at bends, particularly in a duct. Moreover, it has been found that a tape using glue or resin is not strong enough to pull a winch line when this is necessary. The adhesive-tape combination will break if an attempt is made to pull the winch line into the duct, thus requiring further procedures to accomplish the installation of a winch line.

Figure 6:
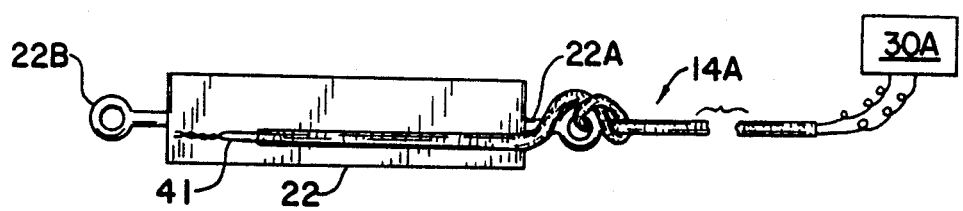
FIG. 6 is a view showing the general arrangement of the tape with conductors, load meter and detector.

In FIGS. 5 and 6, the same reference numerals have been applied to parts which are identical to the parts described in regard to FIGS. 1-4 and the suffix "A" has been applied to reference numerals identifying parts which correspond to the parts already described in regard to these figures.

In the embodiment of the tape shown in FIG. 5, a weft thread 38 intersects warp threads 39 at right angles and forms a tape 14A with a linen or plain weave in the same manner as already described in regard to FIG. 4. One or more warp threads 39 comprised of aromatic polyamide fibers extends along each of the opposite lateral sides of the tape and the next warp thread at each lateral side portion is formed by electrical conductors 41. Each conductor comprises a metal wire 42 covered by an outer sheating 43 of a suitable electrically-insulative material. The electrical conductors 41 take the place of warp threads at opposite lateral sides of the tape and extend along the length of the tape for delivering an electrical signal from the tension meter 22 to a detector 30A which is illustrated in FIG. 6. The tension signal may be fed directly to the conductors by connecting the bared end portions of the conductors to suitable terminals on the tension meter. It is preferred, however, as shown in FIG. 6, to secure an end portion of the tape to an eyelet 22A at one end of the tension meter by a knot so as to form a trailing end portion which extends along the casing of the tension meter. The conductors are connected together to form a conductor loop. This arrangement of parts is used when the tension meter embodies a transmitter that can induce an electrical signal in the conductor loop formed by conductors 41. The electrical signal corresponds to the tension imposed on the tension meter when the free end thereof is coupled to a cable through an eyelet 22B. The detector 30A is directly coupled by the bared end portions of the conductors to indicate the magnitude of tension that is applied to the cable by the tape. The output signal from the detector 30A may be used as a basis for adjusting the control 27 (FIG. 1) during the cable pulling operation.

Referring, again, to FIG. 5, it will be understood that the conductors 41 may be arranged to form warp threads at any desired site in the tape and do not materially affect the strength and other properties of the tape described herein. However, the tape, according to the embodiment of FIG. 5, will have a slightly greater weight per unit of length as compared with the tape described heretofore in regard to FIG. 4 given the same tape width. The width of the tape with conductors can be reduced if it is necessary when the weight per unit of length is critical. One other aspect to the tape of FIG. 5 is the fact that it has increased rigidity as compared with the tape of the FIG. 4 embodiment because the strands of parallel yarn filaments comprise aromatic polyamide fibers. These fibers are more flexible than metal conductors. A tape with metal conductors has sufficient flexibility so that it can be propelled along a course defined by a conduit or the like.

The tape of the present invention eliminates the need to install a nylon rope according to the prior practice for feeding a wire line through the duct for placing the cable therein. It is pointed out that, for example, a nylon rope can stretch over 40% of its length before breaking. When stretched to its limit, the nylon rope can break with a dangerous backlash force which cannot be tolerated in the close working environment of underground work areas as commonly utilized for underground cable placement operations. Moreover, a nylon rope, for example, cannot be used to accurately control the tension imposed on a cable, particularly where it is desired to limit the maximum tension to some predetermined value, such as 500 pounds. The maximum force which at some instance can be 750 pounds, if exceeded, produces a static fatigue failure of the fiber optic material. Accurate control of tension is not possible when a large amount of pulling force is stored as kinetic energy in a stretched nylon rope.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Apparatus for pulling cable along a course of travel in a duct, said apparatus including a tape having a break strength in excess of 750 pounds of pull force and comprising between 20 and 50 parallel warp threads which essentially include filaments joined by a crossed interlocking weave of weft thread to hold the warp threads together in the form of a web, said web having a weight of between 2.8 and 7 pounds per 1000 feet of said tape, means for installing the tape along the course of travel in the duct essentially and only by pulling the tape in the duct, said tape having an elongation of about 5% at least at said break strength for minimizing stored kinetic energy in said tape, means for connecting said tape to a cable, and means for applying through said tape to the cable for placement of the cable in said duct.

2. The tape according to claim 1 further comprising indicia to indicate the length of a course of travel for a cable, said tape having a nominal width sufficient to affix said indicia thereon.

3. The tape according to claim 1 wherein said break strength is about 2900–3000 pounds.

4. The tape according to claim 1 wherein said strands comprise parallel filaments of yarn which consist of aromatic polyamide fibers.

5. The tape according to claim 1 wherein said tape defines a weight of about 7 pounds per 1000 feet to permit movement thereof along a duct forming said course of travel.

6. The tape according to claim 1 wherein at least some of said warp threads include means for transmitting a tension signal in the direction of the length of said tape.

7. The tape according to claim 6 wherein said means includes separate conductors for transmitting a tension signal in the direction of the length of said tape.

8. The tape according to claim 6 wherein said means comprises at least two metal wires each covered with a sheathing of insulation, said wires forming warp threads along lateral side portions of said tape.

9. A method for installing cable along a course of travel in a duct, said method comprising the steps of selecting a tape having a break strength in excess of 750 pounds of pull force and comprising between 20 and 50 parallel warp threads joined by a crossed interlocking weave of weft thread to hold the warp threads together in the form of a web having a weight of between 2.8 and 7 pounds per 1000 feet of said tape, said tape having an elongation of about 5% at least at said break strength to minimize stored kinetic energy in said tape for controlling tension on said cable during advancement along said duct for placement therein, pulling said tape along said course of travel in the duct essentially only by applying tension to the leading end of the tape, coupling an end of said tape to an end of said cable, and pulling said cable in said duct while controlling the tension imposed on said cable by said tape.

10. The method according to claim 9 wherein said course is defined by an underground duct.

11. The method according to claim 9 wherein said course is defined by an overhead guide line.

12. The method according to claim 9 wherein said tape includes conductor means supported by said web threads for transmitting a signal in the direction of the length of said tape, and wherein said method includes the further steps of generating a tension signal corresponding to the tension imposed on said cable by said tape, and transmitting said tension signal by said conductor means along said course incident to pulling the cable therealong.

* * * * *